United States Patent

Envall

[11] Patent Number: 5,582,313
[45] Date of Patent: Dec. 10, 1996

[54] DEPOSIT CONTAINER OF ROOF BOX TYPE

[75] Inventor: Sune Envall, Vasteras, Sweden

[73] Assignee: Dynamid Co., Ltd., Bangkok, Thailand

[21] Appl. No.: 318,653

[22] PCT Filed: May 14, 1993

[86] PCT No.: PCT/SE93/00429

§ 371 Date: Nov. 15, 1994

§ 102(e) Date: Nov. 15, 1994

[87] PCT Pub. No.: WO93/23268

PCT Pub. Date: Nov. 25, 1993

[30] Foreign Application Priority Data

May 19, 1992 [SE] Sweden ................................ 9201565

[51] Int. Cl.⁶ .................... B65D 6/16; B60R 9/055
[52] U.S. Cl. .................. 220/4.28; 220/4.22; 220/334; 224/328; 312/111; 312/265.5; 403/335
[58] Field of Search .................... 224/328, 400, 224/404; 296/37.6; 220/4.28, 4.01, 4.22, 343, 338, 334; 312/111, 140, 265.5; 403/335, 337, 363, 353

[56] References Cited

U.S. PATENT DOCUMENTS

| | | | |
|---|---|---|---|
| 2,482,174 | 9/1949 | Hake | 312/111 |
| 2,804,229 | 8/1957 | Bergh et al. | 220/334 |
| 3,106,759 | 10/1963 | Kytta | 403/337 |
| 3,458,094 | 7/1969 | Wallace | 224/328 |
| 3,915,362 | 10/1975 | Hart | 224/328 |
| 4,378,898 | 4/1983 | Smeenge et al. | |
| 4,406,387 | 9/1983 | Rasor | 224/328 |
| 4,433,881 | 2/1984 | Witten et al. | 312/111 |
| 4,844,565 | 7/1989 | Brafford et al. | 312/111 |
| 4,850,519 | 7/1989 | Farmer, Jr. | 224/328 |

FOREIGN PATENT DOCUMENTS

| | | | |
|---|---|---|---|
| 1580844 | 9/1969 | France | 224/328 |
| C23104651 | 5/1985 | Germany . | |
| A13546220 | 7/1987 | Germany . | |
| 3910952 | 10/1989 | Germany | 224/328 |
| B451123 | 9/1987 | Sweden . | |

Primary Examiner—Linda J. Sholl
Attorney, Agent, or Firm—Larson and Taylor

[57] ABSTRACT

A deposit container useful for many kinds of purposes such as a roof box for a motor car, a ski box, a deposit container for boats, buses, caravans, motor-houses and snow sleighs which is mountable and dismountable. The deposit container includes several small units, namely four box parts which include two identical or nearly identical lid box halves and two identical or nearly identical bottom box halves. These halves can quickly and easily be interconnected to form a lid box and a bottom box, respectively. The deposit container has standard fittings for hinges and locks so that the deposit container can be easily opened and/or secured in a closed position. The lid box halves and the bottom box halves are formed so that when the box is dismounted, the parts can be stacked into each other and stored in a compact state.

7 Claims, 3 Drawing Sheets

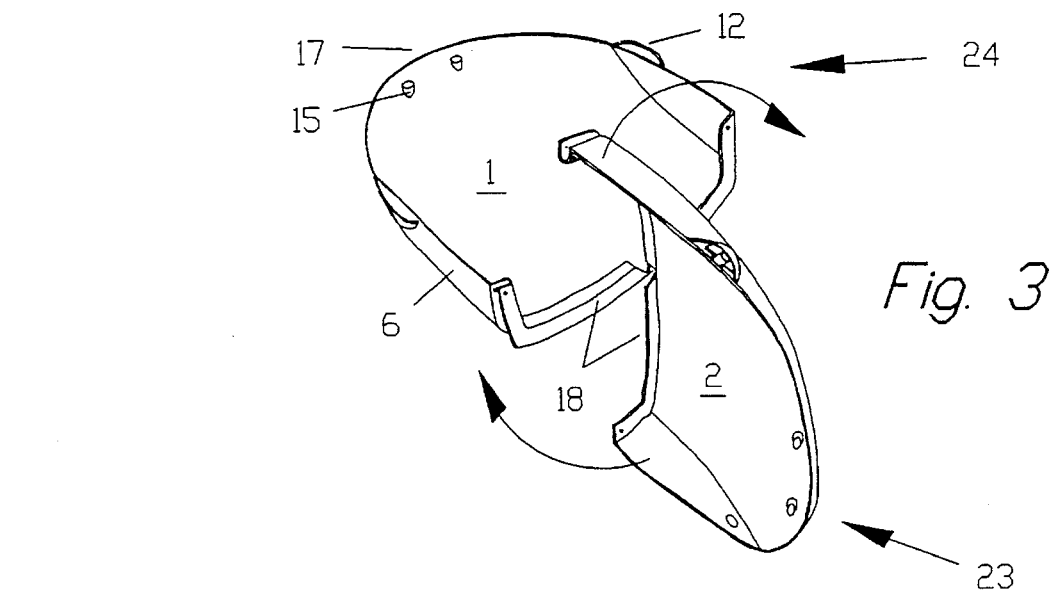
Fig. 3
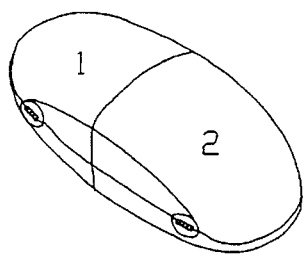
Fig. 4
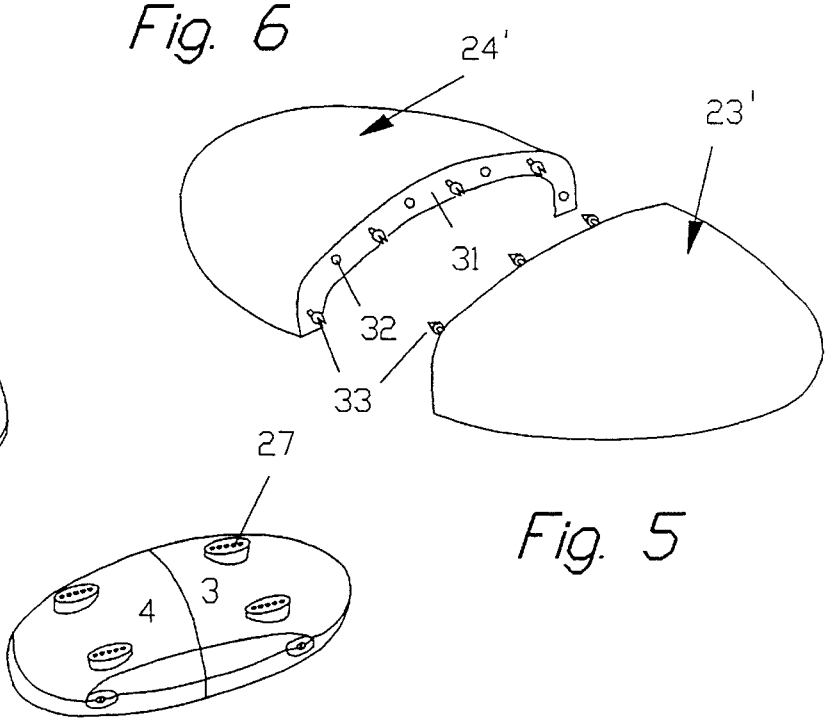
Fig. 5
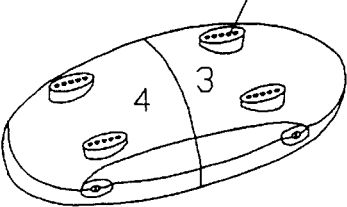
Fig. 6
Fig. 7
Fig. 8

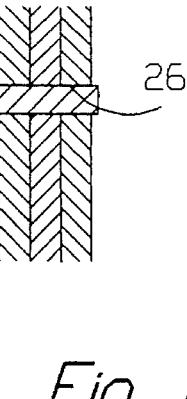
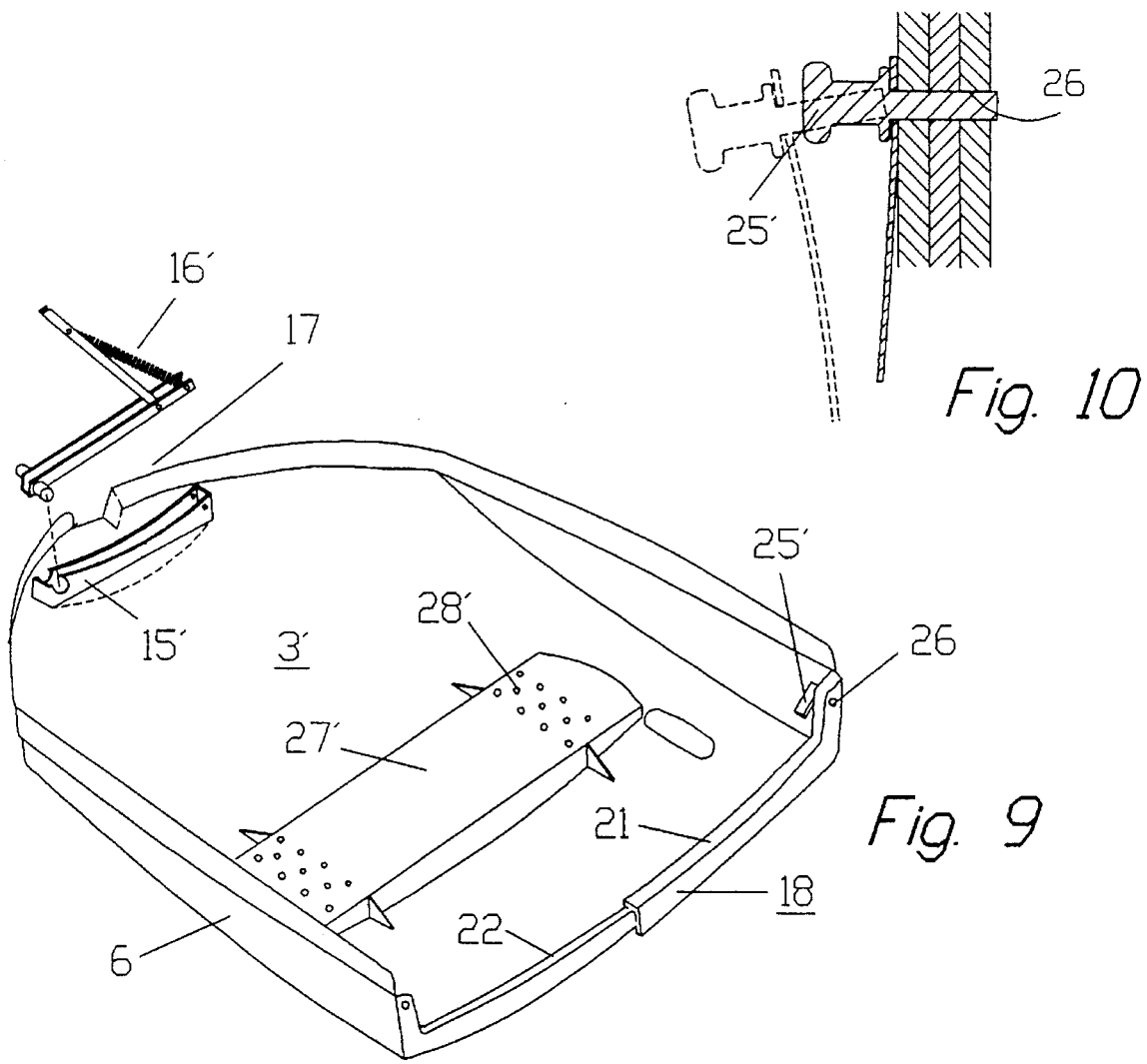
Fig. 10
Fig. 9
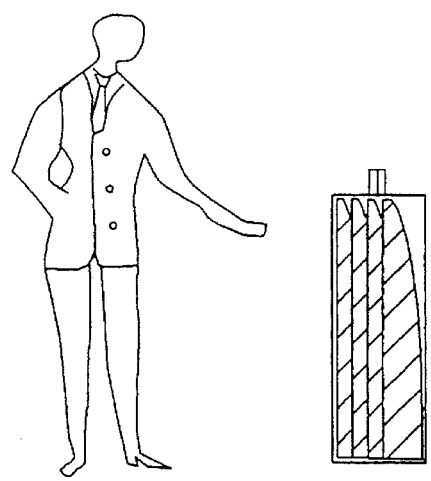
Fig. 11
(Prior Art)
Fig. 12

DEPOSIT CONTAINER OF ROOF BOX TYPE

BACKGROUND OF THE INVENTION

The present invention generally relates to a deposit container of the type which is nowadays commonly used as a motor car roof-box, a ski box, or as a container for any kinds of goods.

There exist many various types and sizes of roof boxes of the above-mentioned type. Most roof boxes are relatively long, often between 2 and 2.5 meters long, and they have generally been made as a bottom box part which can be clamped to a couple of roof racks, load racks or any other mounting means at the roof of a motor car, and which bottom box part has a rotatably connected lid box part, which is usually rotatably connected at the front edge or the rear edge of the bottom box part, but which may alternatively be rotatably connected at any of the long sides of the car roof box.

A deposit container of the above mentioned type also is useful as a load container for boats, ski sleighs and for many other purposes.

A problem in connection to roof boxes of the priorly known type is that said boxes are very bulky, and that the boxes often must be hoisted up to the garage ceiling by means of blocks and pulleys when the roof boxes are removed from the car or the bus, or from the boat etc. It is also possible to put the roof box down standing on its rear end and to strap the box e.g. to a wall so that the box does not tilt over and damages objects or persons standing in the vicinity the the roof box. Many car drivers have no garage and can often not have the roof box standing or hanging in his home, and in such cases it may be necessary to let the roof box remain on the motor car all the year. This leads to unnecessarily increased fuel consumption upon driving the car, there appear problems when the car is to be washed, wind noise, destruction of the lacquer etc.

Upon sale in a store, such roof boxes also occupy so large space that they are generally exposed in special storage stands with several boxes placed above each other. Such storage stands are large, bulky and expensive.

The known roof boxes mostly are manufactured by a vacuum forming process of a suitable plastic material generally using large plastic plates. The tools for vacuum formation are large and are difficult to handle, and the plastic plate material from which the roof box bottom and the roof box lid is press-formed are expensive.

SUMMARY OF THE INVENTION

The object of the invention therefore is to suggest a deposit container which can be used for many different purposes, for instance as a roof box for a motor car, as a ski box, as a deposit box for boats, buses, caravans, motor homes, snow sleighs etc.

Further objects of the invention include a deposit container:

which is formed by several small units;

which can be mounted and dismounted, and which, in its non-mounted of dismounted condition, occupies less than half the space as compared with the above mentioned known roof boxes;

which can quickly and easily be mounted and dismounted respectively, in particular without the need of using tools;

which is formed by four box parts, namely two identical bottom box parts and two identical lid box parts;

which can be manufactured by an injection mold process thereby forming two like parts for the bottom box part and two like parts for the lid box part;

whereby there is used a relatively cheap plastic material like polypropylene, and the manufacturing process makes use of of a relatively cheap tool the size of which is not more than half the size as compared with the tools for the priorly known roof boxes;

which have standardized connection means or fittings at the bottom box part and the lid box part in which connection means hinges or locks can be introduced and secured as desired;

and which is formed such that the four parts roof box parts, in their dismounted condition can be partly introduced in each other, whereby the entire system of roof box parts can be packed in a plastic box or a carton that can be used both for sale and for storing of the roof box parts in their dismounted condition, whereby the roof box can be handled like any type of standard goods in stores, and whereby there is no need to hoist the roof box to the garage ceiling, but whereby the roof box can be placed standing or laying down anywhere without the risk of turning over.

The transport container or the roof box according to the invention is mainly characterized in that the bottom box part and the lid box part are similar to each other and that both said box parts are composed of two identical box part halves, each of said two box part halves being manufactured in one and the same injection mold machine, whereby the roof box is symmetrical about a transverse vertical plane.

Both pieces of the bottom box part and of the the lid box part respectively are, at a transversal interconnection plane thereof, formed with means for joining said parts to form an interconnected unit. The means for forming may for instance be a U-shaped groove extending over half the width of the box part connection plane, and a rib corresponding to said U-shaped groove and extending of the other half of the width of the box part connection plane. It is also possible to join the bottom and lid halves by means of spring pins of any known type and corresponding bores, or in the most simple embodiment of the invention by means of screws and wing nuts cooperating therewith.

It is thereby easy to interconnect two bottom box halves and the two lid box halves to form an integral roof bottom box and integral roof lid box respectively in that the parts are moved together with the joining edges thereof facing each other and are secured to each other.

In the case where the halves are formed with U-shaped grooves and equivalent ribs, the halves are moved together in a position rotated along a longitudinal axis about 90° in relation to each other, whereafter said halves are rotated back about said longitudinal axis to form a common bottom box or lid box. Thereby the rib of one of the box part halves is being locked in the U-sbaped groove in the other box part half, and vice versa. The box part halves are locked in their interconnected positions by means of a couple of simple and easily mountable and dismountable spring pins or a similar means which are introduced into fitting bores of the U-shaped groove and the ribs respectively thereby preventing the bottom and lid part halves to rotate in relation to each other.

In the case that the box part halves are joined using spring pins or screw-nut means the joining edges may be flat and even and preferably are formed with cooperating bores for the pins and the screw-nut means respectively.

At one of the longitudinal sides of the roof bottom box part or the roof lid part hinges are introduced and are secured in standard sockets, and at the opposite longitudinal side locks are introduced in the same type of standard sockets and are secured by means of simple pins or similar means, whereupon a bottom box part is interconnected to a lid box part. Thereafter the roof box is ready for direct use or for being mounted on roof racks or on any other mounting means at the roof of a car or a bus, on the deck of a boat or in any other place.

Now the invention is to be described more closely in connection to the accompany drawings which disclose embodiments of a roof box according to the invention.

BRIEF DESCRIPTION OF THE DRAWINGS

In the drawings.

FIG. 3 diagrammatically illustrates the interconnection of the two halves of a first embodiment of a roof box.

FIG. 4 is a cross section view of a spring pin securing means for said two box halves.

FIG. 5 diagrammatically illustrates the joining principle for a second embodiment of a roof box.

FIG. 6 shows, like in FIG. 4, a method of securing the two box halves in said second embodiment.

FIG. 7 snows a ready mounted roof box, seen obliquely from above, and

FIG. 8 shows the same roof box obliquely from underneath.

FIG. 9 shows a bottom box part of an alternative embodiment of a roof box.

FIG. 10 shows a method of securing the roof box halves to each other by means of an integral locking means.

FIG. 11 shows a sale-packed or dismounted roof box according to the invention in its package.

FIG. 12 shows, compared thereto, a roof box of a priorly known type and of substantially the same size as the roof box which is shown dismounted in FIG. 11.

DESCRIPTION OF THE PREFERRED EMBODIMENTS

Figure 1:
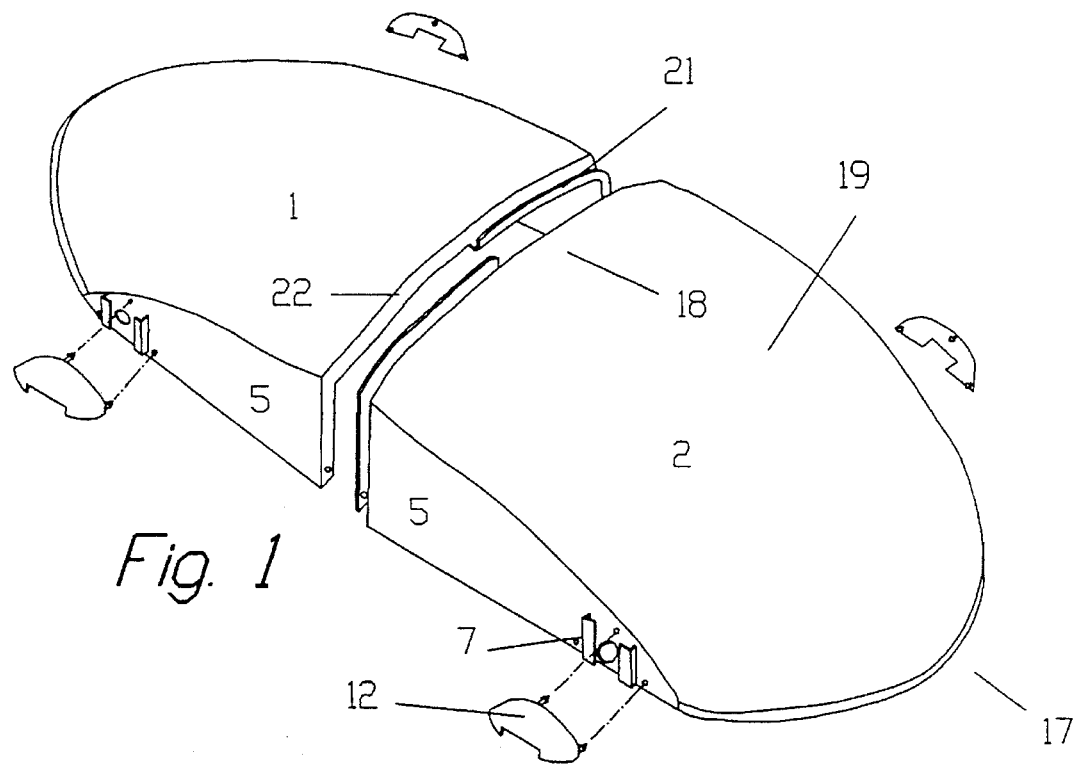
FIG. 1 shows, in an exploded view perspectively obliquely from above, a lid for a deposit container or a roof box according to the invention.

The deposit container or roof box comprises four main parts, namely two identical lid box halves 1 and 2 and two identical bottom box halves 3 and 4. The halves are mainly elliptical both in the horizontal direction and the vertical direction, so that the ready roof box gets a low air flow resistance and provides very little wind noise when transported at high speeds. The two longitudinal sides 5 and 6 respectively are flattened along a part of the roof box, and at the exterior side of said flattened sides there are standard sockets or fittings 7 for hinges 8 or locks 9. In the drawings, the standard fittings are shown in the form of two cooperating angle bars which, in common, form a vertical slot in which any desired means can be introduced. The hinges 8 are formed so that they simply are let down in the fittings 7 and are secured in this position for instance by means of simple pins which are introduced in bores 10 in the hinge 8 and bores 11 in the roof box sides 5 and 6. The locks 9 are formed so that they can be secured in identical bores 11 of the roof box sides 5 and 6. The mounted hinges 8 and locks 9 are covered by bowl-formed casings 12 having barb-like securing pins 13 arranged to be introduced in corresponding bores 14 of the roof box sides 5 and 6. At the bow-formed ends 17 of the respective roof box parts there are sockets 15 for a gas spring 16 or a similar means for keeping the lid in its opened position or for making the lid drop down softly and slowly when the lid is being closed.

Figure 2:
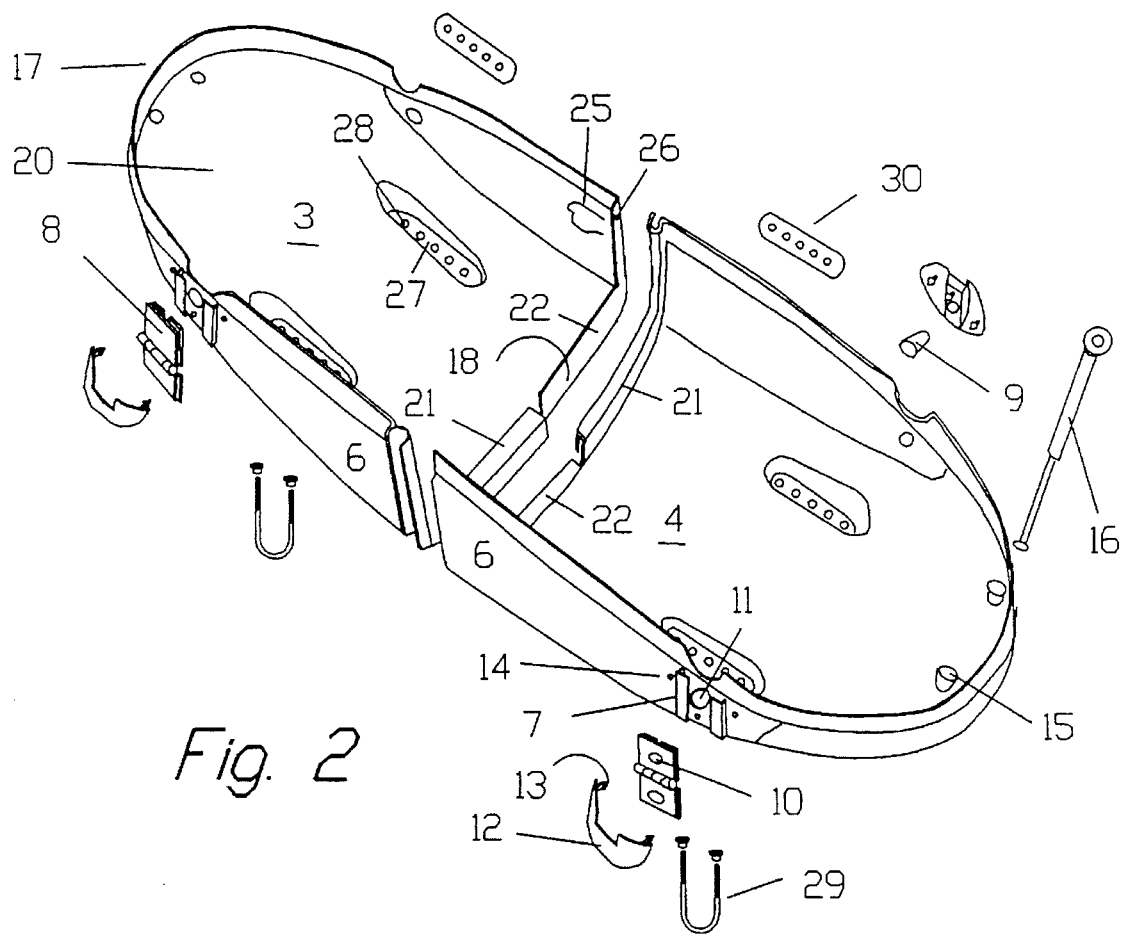
FIG. 2 correspondingly shows a bottom box part of the same deposit container.

The lid box parts 1 and 2 and the bottom box parts 3 and 4 respectively are identical and can be manufactured in one and the same press-cast mold. As shown in FIGS. 1 and 2 each of the parts 1, 2, 3 and 4 is formed like a semi-bowl having a convex upper surface and bottom surface respectively and having a curved front and rear edge respectively and a flat joining edge 18. The lid has a convexly upwards extending lid cup 19, and the bottom similarly has a convexly downwards extending bottom cup 20. In the illustrated case each joining edge 18 has two inwardly extending joining pieces, namely a channel forming a U-shaped groove 21 extending along the edges of the sides 5 and 6 and along half the width of the lid cup 19 and the bottom cup 20 respectively, and a rib 22 extending along the edges of the opposite flat sides 5 and 6 and along the other half of the width of the lid cup 19 and the bottom cup 20 respectively. The meeting edges of the groove 21 and the rib 22 are slightly bevelled to form a V-groove for making it possible to join the two lid and bottom halves rotated 90° angle in relation to each other for interconnection of said halves to form a complete lid piece and a complete bottom piece.

As diagrammatically illustrated in FIG. 3 the interconnection of the lid box halves or the bottom box halves 23, 24 is made in that one 23 of said halves is rotated about 90° in relation to the other half 24; the two halves are moved together with the flat joining edges 18 thereof facing each other, so that the V-shaped grooves between the. U-shaped grooves 21 and the ribs 22 engage each other; said one lid half 23 is rotated back, whereby the rib 22 of the first half 23 engages the groove 21 of the other half 24 and vice versa. The halves now are interconnected so that they can not be mutually displaced longitudinally or transversally, and they are to be secured in their interconnected condition against rotation by means of a spring pin 25 or any similar means which is engages bores 26 of the U-shaped grooves 21 and of the ribs 22. The common beam formed by the joining edge at the transversal center of the roof box also acts as a stiffening beam and as a rain water lock in that rain water from the lid part is drained to the sides. Eventually existing water in the box bottom part is drained through the V-shaped groove between the U-shaped groove 21 and the rib 22.

A hinge 8 is pressed down in the fittings 7 on one side of the bottom box or the lid box and is locked therein by means of a pin which is introduced through bores 10, 11 of the hinge and the bottom box and the lid box. On top of the hinge, a casing 12 is connected in that the barb pins 13 are introduced into bores 14 of the lid and the bottom sides 5, 6. On the opposite side of the box a lock 9 is introduced in the fitting 7 and in the bore 11 and is secured as known per se. A cover or casing 12 is also mounted over the lock 9. A gas spring 16 can be mounted between the sockets 15 of the bottom box and the lid box at one end 17 or at both ends.

For making it possible to place the deposit container lying down on an even support the bottom box can be formed with several feet 27 which in common form an even support surface for the container. The feet 27 can be formed with several through bores 28 in which a clamp yoke 29 can engage and can be screw connected for keeping the container secured to a roof rack of a motor car or to any other mounting means. Preferably a safety washer 30 is mounted inside each foot 27.

In the embodiment of the roof box diagrammatically illustrated in FIG. 5 the meeting edges 31 are flat and even and are formed with bores 32 in which barb-like spring pins 33 can be introduced for keeping the halves together, or it is alternatively possible to use simple screw-wingnut means 34 as shown in the cross section view in FIG. 6.

Rather than using gas spring as a spring means between the bottom box and the lid box it is possible to make use of a spring biassed lever 16' which can be releasable snap connected in a corresponding socket 15' in each of the bottom box halves, as shown in FIG. 9. Also, the coupling means shown in FIGS. 4 and 6 can be substituted by a pin 25' which is fixedly connected to the bottom box 3' or the lid box and which is kept in place by a spring clamp and which can snap engage the bores 26 of interengaging box halves and keep said halves locked to each other. Such an arrangement is shown in FIGS. 9 and 10.

After the roof box has been used it can easily be dismounted by releasing the gas spring 16, one of the securing means for the hinge and the spring pins 26 for the box portions 1–4. The box portions thereafter can be placed together, partly introduced in each other, and can be stored in its package as shown in FIG. 11, whereby the roof box occupies a substantially less space than the bulky, priorly known roof box which is shown in FIG. 12 as a comparative example.

Reference numerals 1 lid box part
2 lid box part
3 bottom box part
4 bottom box part
5 longitudinal side
6 longitudinal side
7 fitting
8 hinge
9 lock
10 bore
11 bore
12 casing
13 barb pin
14 bore
15 socket
16 gas spring
17 front/rear edge
18 joining edge
19 lid cup
20 bottom cup
21 U-groove
22 rib
23 bottom box half
24 bottom box half
25 spring pin
26 bore
27 foot
28 bore
29 clamp yoke
30 safety washer
31 edge
32 bore
33 spring pin
34 screw/wingnut

I claim:

1. A deposit container comprising:

four box parts composed of two identical lid box halves and two identical bottom box halves having fittings for at least one of hinges and locks, wherein each of the box parts has an outwardly facing U-shaped groove, at a transversal joining edge, extending along half of a width of the box part and a rib corresponding to and fitting to said U-shaped groove and extending along the other half of the width of the box part, wherein each of said box parts are formed with a flat joining edge, said joining edge having means for quick and simple joining of said box parts, in box half pairs, to form an integral complete lid and an integral complete bottom respectively, wherein said joining edge for the lid box halves and the bottom box halves of said deposit container extends in a transversal and a vertical plane to form said deposit container which is symmetrical about said transversal and said vertical planes, and wherein said lid box halves and said bottom box halves are so similar in shape and size that said box parts, when the deposit container is dismounted, can be stacked into each other and can be stored in a compacted state.

2. A deposit container according to claim 1 wherein said joining edges of the U-shaped groove and the rib are beveled so as to form a V-shaped groove therebetween, whereby said lid box halves and said bottom box halves each can be joined to form a complete lid and a complete bottom, respectively, by moving said box halves together, rotated about 90° in relation to each other, and thereafter rotating said halves back, so that the U-shaped grooves and the corresponding ribs in turn engage.

3. A deposit container according to claim 1 wherein the lid box halves and the bottom box halves, respectively, are self-locking against mutual displacement in the longitudinal and transversal direction, and said box parts are secured against mutual rotation by at least one simple locking pin engaging at least one corresponding bore at the joining edges.

4. A deposit container according to claim 1 wherein the joining edges are flat and even, and are formed with bores for interconnecting the lid box halves or bottom box halves by means for connecting such as a barb-like pin or a screw and nut connection.

5. A deposit container according to claim 1 wherein said fittings are formed with a slot in which at least one of said hinges and said locks can be pressed down and can be locked by a pin.

6. A deposit container according to claim 1 wherein said deposit container further comprises releasable, half-bowl formed covers arranged for being snap connected over at least one of said hinge and said lock.

7. A deposit container according to claim 1 wherein both the lid and the bottom have a convex, cup-formed plane and each has a bow-formed end, wherein at least the bottom box halves are formed with feet which provide an even support surface, and wherein said feet have bores arranged for cooperation with a clamp yoke so that the deposit container can be clamped to a suitable object.

* * * * *